United States Patent [19]

Suran et al.

[11] Patent Number: 5,135,252

[45] Date of Patent: Aug. 4, 1992

[54] MOUNTING MEANS FOR A VEHICLE PASSENGER SIDE AIR BAG STRUCTURE

[75] Inventors: Michael J. Suran, Clarkston; John M. Bederka, Madison Heights, both of Mich.

[73] Assignee: Chrysler Corporation, Highland Park, Mich.

[21] Appl. No.: 731,173

[22] Filed: Jul. 15, 1991

[51] Int. Cl.⁵ .............................................. B10R 21/16
[52] U.S. Cl. ................................... 280/732; 280/743
[58] Field of Search ................ 280/728, 731, 732, 743

[56] References Cited

U.S. PATENT DOCUMENTS

| | | | |
|---|---|---|---|
| 4,111,457 | 9/1978 | Kob et al. | 280/728 |
| 4,153,273 | 5/1979 | Risko | 280/732 |
| 4,759,568 | 7/1988 | Paefgen et al. | 280/732 |
| 4,834,421 | 5/1989 | Korber et al. | 280/732 |
| 4,915,410 | 4/1990 | Bachelder | 280/732 |
| 5,031,930 | 7/1991 | Sato | 280/732 |

Primary Examiner—Kenneth R. Rice
Attorney, Agent, or Firm—Edward A. Craig

[57] ABSTRACT

Mounting means for a vehicle passenger side air bag structure are provided. The air bag structure includes an air bag housing for containing an uninflated air bag and an air bag deployment chute mounted in a vehicle instrument panel opening on the passenger side. A portion of the air bag housing is slidably received in the air bag deployment chute. A connector bracket interconnects the air bag housing and air bag deployment chute preventing separation thereof during deployment of an air bag.

4 Claims, 2 Drawing Sheets

MOUNTING MEANS FOR A VEHICLE PASSENGER SIDE AIR BAG STRUCTURE

BACKGROUND OF THE INVENTION

1. Field of the Invention

This invention relates to mounting means for a vehicle passenger side air bag structure which includes an air bag housing which is slidably received in an air bag deployment chute mounted in an opening of a vehicle instrument panel. A connector bracket secures the housing and chute together.

2. Description of Related Art

Inflatable air bag structures are being commonly used in passenger vehicles to promote passenger safety in the event of an accident. Such air bag structures include inflation means which, when activated, rapidly form a gas which causes high speed inflation of air bags in front of passengers to absorb impact shock to thereby minimize injury. Sensor systems are provided to cause activation of the air bag structure immediately upon vehicle impact.

Air bags are folded and mounted in relatively small canister-like housings which are positioned behind the vehicle instrument panel. The housing is slidably mounted in a chute structure which, in turn, is mounted in an opening in the instrument panel in front of the area occupied by the passenger in the front seat of the vehicle. As the air bag is deployed, it passes into the chute and is guided by the chute into the proper area within the vehicle to function in the desired shock absorbing fashion.

It is important that the air bag be deployed through the chute without any hitches of any sort. The expansion which causes deployment of the chute also results in a recoil effect upon the air bag housing. This recoil effect tends to cause separation of the air bag housing from the chute. Undue separation could cause snagging of the air bag with the chute and housing structure and result in improper air bag deployment. In accordance with the present invention, this possibility is minimized by providing adjustable bracket structure interconnecting the chute and air bag housing.

SUMMARY OF THE INVENTION

Mounting means for a vehicle passenger side air bag structure are provided. The air bag structure includes an air bag housing for containing an uninflated air bag. An air bag housing bracket is secured between the air bag housing and support structure of a vehicle. An air bag deployment chute is mounted in an opening provided in a vehicle instrument panel on the passenger side thereof. A portion of the air bag housing is slidably received in the air bag deployment chute in a portion of the air bag deployment chute extending forwardly of the instrument panel.

A connector bracket is provided. The connector bracket is substantially U-shaped and includes a crossmember with a leg extending from each end thereof. Fastening means secure the crossmember to the exterior of the air bag deployment chute. Each leg has an elongated adjustment slot therein. A pair of spaced apart catches extend from the exterior of the air bag housing. Each catch extends through one of the elongated adjustment slots and functions to prevent separation of the air bag housing and air bag deployment chute during deployment of an air bag. The elongated adjustment slots accommodate variations in the position of the air bag housing with respect to the air bag deployment chute.

The legs of the connector bracket are fabricated of springy material. Each catch has an angled forward cam surface in line with its respective leg of the connector bracket and a rearward surface at substantially right angles to its respective leg of the connector bracket. The legs of the connector bracket deflect upon contact with the cam surfaces of the catches upon sliding of the air bag housing into the air bag deployment chute to permit passage of the catches and reception thereof into the elongated adjustment slots. The rearward surfaces of the catches thereafter prevent withdrawal of the air bag housing. The cam surfaces preverably are curved. Preferably, each leg of the connector bracket terminates in an angled portion to facilitate the caming action.

IN THE DRAWINGS

DETAILED DESCRIPTION OF A PREFERRED EMBODIMENT

Figure 1:
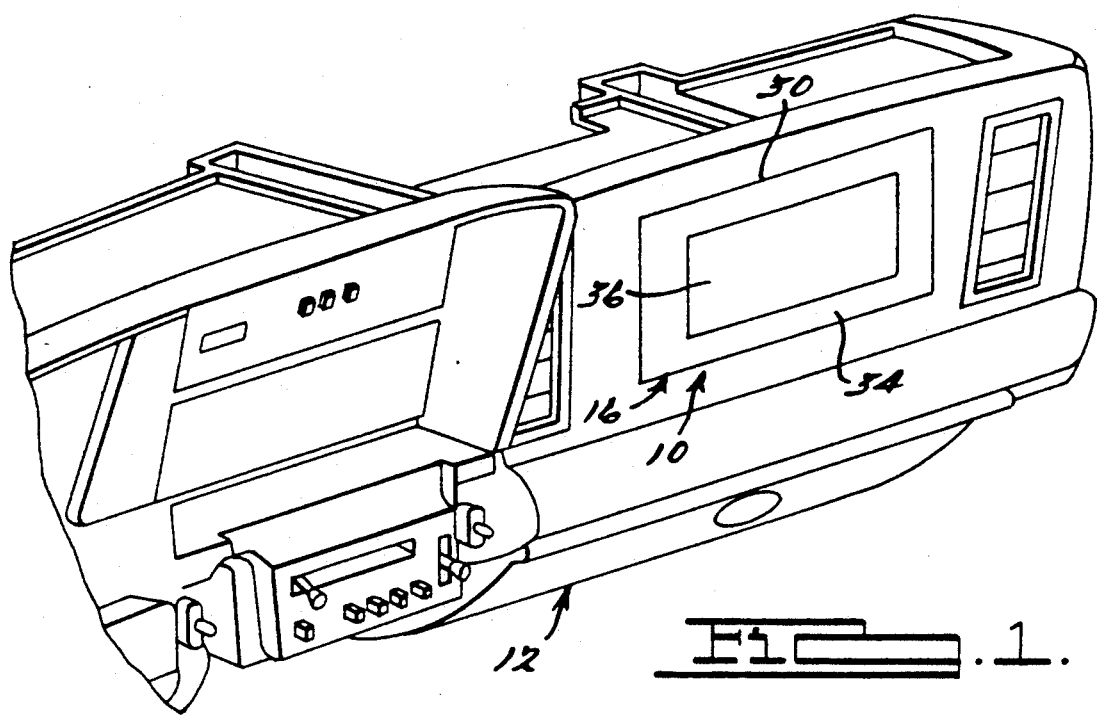
FIG. 1 is a view in perspective of the passenger side portion of an instrument panel as viewed from the interior of a vehicle illustrating the positioning of the passenger side air bag structure in accordance with one embodiment of the present invention.
Figure 2:
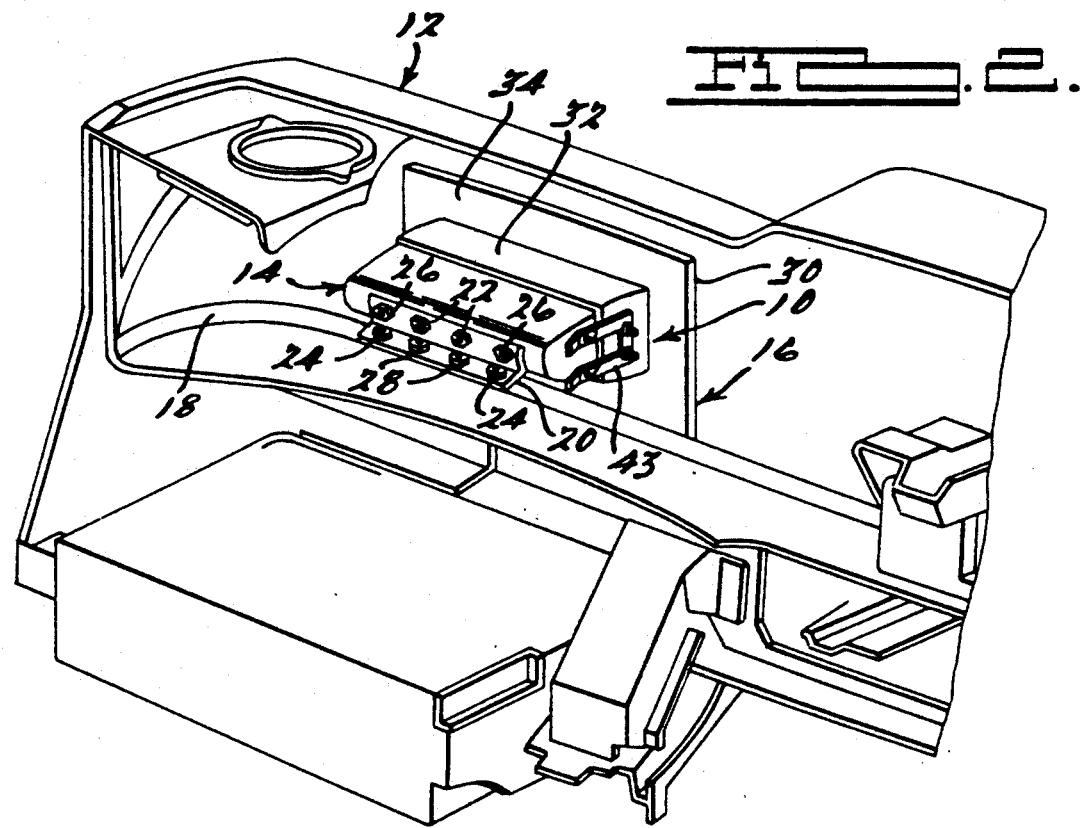
FIG. 2 is a view in perspective of the opposite side of the instrument panel shown in FIG. 1 illustrating the forward portion of the passenger air bag structure.

Referring to FIGS. 1 and 2, it will be noted that the vehicle passenger side air bag structure 10 of the present invention is mounted on the passenger, or right, side o the instrument panel 12. The instrument panel 12 is, of course, securely mounted to vehicle structure as is conventional. The air bag structure 10 includes an air bag housing 14 and an air bag deployment chute 16.

The air bag housing 14 encloses a folded air bag and air bag inflater device (not shown) as is conventional. The air bag inflater device includes expansion means which, when energized, rapidly forms into an inflating gas. A sensor system (not shown) is provided in the vehicle structure for detecting impact and instantly causing air bag inflation. Such structures are conventional and wellknown.

The air bag housing 14 is secured to vehicle support structure 18 by means of an air bag housing bracket 20. The bracket 20 is substantially V-shaped with each leg including a plurality of openings through which threaded studs 22 extending from the air bag housing 14 and threaded studs 24 extending from vehicle support structure 18 extend. Nut structures 26, 28 are received on the threaded studs to thereby secure the air bag housing 14 in place.

The air bag deployment chute 16 is mounted in an opening 30 provided in the instrument panel 12 on the passenger side thereof. The air bag deployment chute 16 includes a hollow chute portion 32 which is surrounded by a peripheral flange 34 on the rearward edge thereof, the terms "rearward" and "forward" being used to denote a position with respect to the forward or rearward end of the vehicle. The flange 34 is flush with the exterior surface of the instrument panel 12 as will be noted in FIG. 1. A frangible door 36 is provided within the flange 34. The door 36, when impacted by an expanding air bag, deploys rearwardly permitting the air bag to exit and expand in front of a passenger. The air bag deployment chute 16 functions to guide the air bag in its initial deployment and prevents the air bag housing 14 from bellmouthing, that is, expanding sidewardly, which could result in mis-deployment of the air bag.

A portion of the air bag housing 14 is slidably received in the air bag deployment chute 16. As will be noted in FIG. 3, the rearward edge 38 of the air bag housing 14 extends to about the midpoint of the air bag deployment 16. Inflation of the air bag results in a recoil effect which tends to separate the air bag housing 14 from the air bag deployment chute 16. Should the edge 38 of the air bag housing 14 recede to the edge 40 of the air bag deployment chute 16, it is possible for the air bag to become snagged and mis-deploy. It is therefore desired that such separation of these elements should not occur.

A connector bracket 42, 43 is provided on each side of the air bag deployment chute to secure the air bag housing 14 and the air bag deployment chute together. Each connector bracket is substantially U-shaped and of the same construction. The connector bracket 43 will be described in detail.

The connector bracket 43 includes a crossmember 44 with a leg 46, 48 extending from each end thereof. Fastening means in the form of spaced apart threaded studs 50, 52 extend from the side of the air bag deployment chute 16. Equivalent studs 54, 56 are provided on the other side of the air bag deployment chute. The studs extend through openings in the crossmember 44 and are secured in place by means of nuts 58, 60. Each leg 46, 48 has an elongated adjustment slot 62, 64 therein. Each leg 46, 48 terminates in an outwardly angled portion 66, 68 which facilitates mounting of the air bag housing 14 as will be later described.

Figure 3:
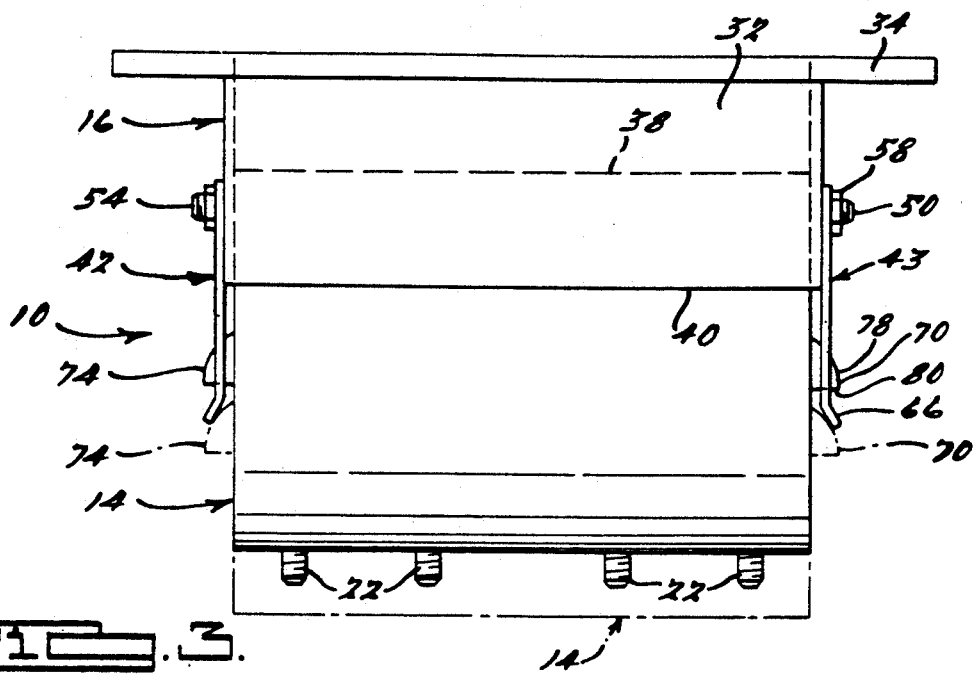
FIG. 3 is a top plan view of the vehicle passenger side air bag structure.
Figure 4:
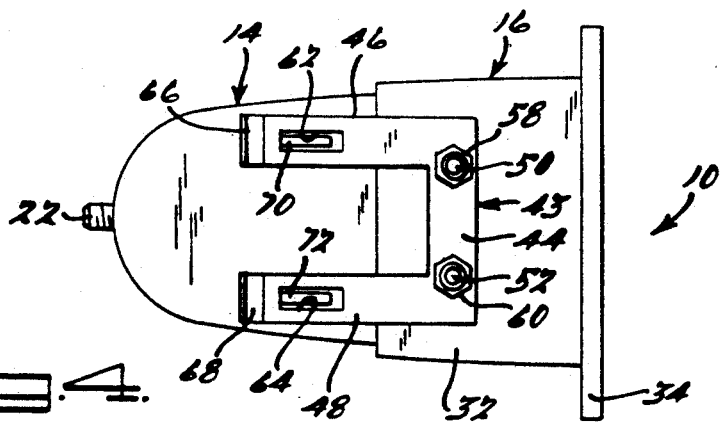
FIG. 4 is an end view of the passenger side air bag structure of FIG. 3 as viewed from the right side thereof.
Figure 5:
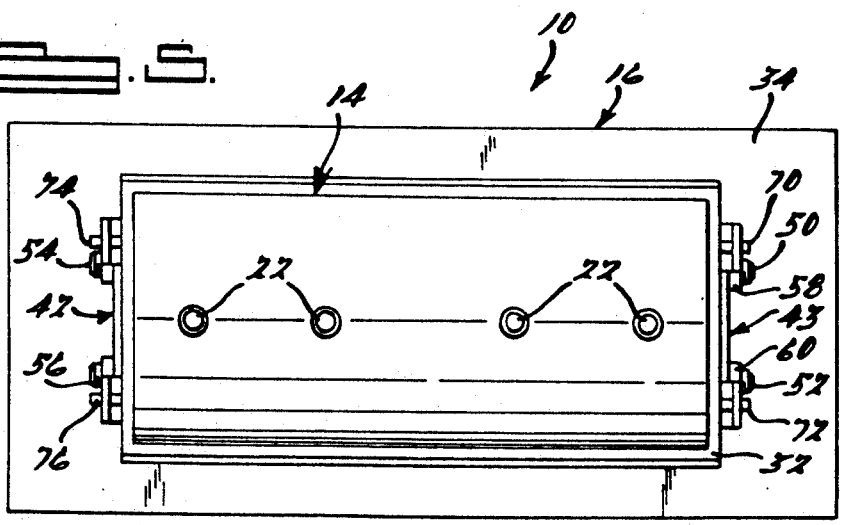
FIG. 5 is a front elevational view of the passenger side air bag structure.

A pair of spaced apart catches 70, 72 and 74, 76 are provided on each side of the air bag deployment chute 16. Each catch has an angled forward cam surface 78 which is preferably curved as shown. The cam surfaces are in line with the respective leg of the connector bracket which the catch is designed to engage. Each catch also has a rearward surface 80 which is at substantially right angles to its respective leg of the connector bracket. The legs of the connector bracket are fabricated of springy material, such as steel. The air bag housing 14 is mounted in the air bag deployment chute 16 by sliding it into place. FIG. 3 indicates in dotted lines the air bag housing 14 partially inserted into the chute to a point where the cam surfaces of the catches engage the angled ends of the legs of the connector brackets 42, 43. Further insertion of the air bag housing causes the legs to deflect outwardly, thereby permitting passage of the catches therealong until the catches reach the elongated slots and are received therein as shown in FIG. 4. The curvature of the catch cam edges and outturned end of the legs facilitate the caming action. The rearward surfaces of the catches thereafter prevent withdrawal of the air bag housing, it being appreciated that these surfaces will contact the outer edges of the elongated slots.

When the air bag housing 14 is fully inserted into the air bag deployment chute 16, the inner edge 38 of the air bag housing 14 is positioned as shown in FIG. 3. If, during deployment of the air bag, the air bag housing separated from the air bag deployment chute to a point adjacent the edge 40 of the air bag deployment chute 16, the air bag could possibly snag and misdeploy as previously mentioned. This is prevented by the connector brackets 42, 43.

We claim:

1. Mounting means for a vehicle passenger side air bag structure comprising an air bag structure including an air bag housing for containing an uninflated air bag, an air bag housing bracket secured between the air bag housing and support structure of a vehicle, an air bag deployment chute mounted in an opening provided in a vehicle instrument panel on the passenger side thereof, a portion of the air bag housing slidably received in the air bag deployment chute in a portion of the air bag deployment chute extending forwardly of the instrument panel, a connector bracket, the connector bracket being substantially U-shaped and including a crossmember with a leg extending from each end thereof, fastening means securing the crossmember to the exterior of the air bag deployment chute, each leg having an elongated adjustment slot therein, a pair of spaced apart catches extending from the exterior of the air bag housing, each catch extending through one of said elongated adjustment slots and functioning to prevent separation of the air bag housing and air bag deployment chute during deployment of an air bag, the elongated adjustment slots accommodating variations in the position of the air bag housing with respect to the air bag deployment chute.

2. Mounting means for a vehicle passenger side air bag structure as defined in claim 1, wherein the legs of the connector bracket are fabricated of springy material, each catch having an angled forward cam surface in line with its respective leg of the connector bracket and a rearward surface at substantially right angles to its respective leg of the connector bracket, said legs of the connector bracket deflecting upon contact with the cam surfaces of the catches upon sliding of the air bag housing into the air bag deployment chute to permit passage of the catches and reception thereof into the elongated adjustment slots, the rearward surfaces of the catches thereafter preventing withdrawal of the air bag housing.

3. Mounting means for a vehicle passenger side air bag structure as defined in claim 2 wherein said cam surfaces are curved.

4. Mounting means for a vehicle passenger side air bag structure as defined in claim 2, wherein each leg of the connector bracket terminates in an angled portion to facilitate the camming action.

* * * * *